US006209068B1

(12) United States Patent
Hill et al.

(10) Patent No.: US 6,209,068 B1
(45) Date of Patent: Mar. 27, 2001

(54) READ LINE BUFFER AND SIGNALING PROTOCOL FOR PROCESSOR

(75) Inventors: David L. Hill, Cornelius; Chinna Prudvi, Portland; Derek T. Bachand, Portland; Matthew A. Fisch, Portland, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/999,242

(22) Filed: Dec. 29, 1997

(51) Int. Cl.[7] .................................................. G06F 12/16

(52) U.S. Cl. ........................................ 711/159; 711/141

(58) Field of Search .................................. 711/118, 133, 711/141, 154, 159, 165, 169; 710/52, 62

(56) References Cited

U.S. PATENT DOCUMENTS 5,367,660 * 11/1994 Gat et al. ................................ 711/3
5,386,579 * 1/1995 Bourekas et al. ...................... 712/43
5,519,701 * 5/1996 Colmant et al. ..................... 370/412
5,642,494 * 6/1997 Wang et al. ......................... 711/140
5,793,992 * 8/1998 Steele et al. ......................... 710/113
5,802,575 * 9/1998 Greenley et al. .................... 711/144
5,881,253 * 3/1999 Seeman ............................... 710/128

* cited by examiner

*Primary Examiner*—Kevin L. Ellis
(74) *Attorney, Agent, or Firm*—Kenyon & Kenyon

(57) ABSTRACT

A data control method in a microprocessor is disclosed. According to the method, a request is generated on an external bus for data to be read to the processor. The requested data is read from the external bus to an intermediate memory in the processor and, thereafter, read from the intermediate memory to a destination. When the intermediate memory is full, the read of data from the external bus is stalled until the intermediate memory is no longer full. Typically, stalling is accomplished by generating a stall signal on the external bus, which may be generated during a cache coherency phase of the transaction to which the requested data relates.

12 Claims, 4 Drawing Sheets

READ LINE BUFFER AND SIGNALING PROTOCOL FOR PROCESSOR

BACKGROUND OF THE INVENTION

1. Field of the Invention

The present invention relates to an improved read line buffer for cache systems of processor and to a communication protocol in support of such a read line buffer.

2. Related Art

In the electronic arts, processors are being integrated into multiprocessor designs with increasing frequency. A block diagram of such a system is illustrated in FIG. 1. There, a plurality of agents 10–40 are provided in communication with each other over an external bus 50. The agents may be processors, cache memories or input/output devices. Data is exchanged among the agents in a bus transaction.

A transaction is a set of bus activities related to a single bus request. For example, in the known Pentium Pro processor, commercially available from Intel Corporation, a transaction proceeds through six phases:

Arbitration, in which an agent becomes the bus owner,

Request, in which a request is made identifying an address,

Error, in which errors in the request phase are identified,

Snoop, in which cache coherency checks are made,

Response, in which the failure or success of the transaction is indicated, and

Data, in which data may be transferred.

Other processors may support transactions in other ways.

In multiple agent systems, the external bus 50 may be a pipelined bus. In a pipelined bus, several transactions may progress simultaneously provided the transactions are in mutually different phases. Thus, a first transaction may be started at the arbitration phase while a snoop response of a second transaction is being generated and data is transferred according to a third transaction. However, a given transaction generally does not "pass" another in the pipeline.

Cache coherency is an important feature of a multiple agent system. If an agent is to operate on data, it must confirm that the data it will read is the most current copy of the data that is available. In such multiple agent systems, several agents may operate on data from a single address. Oftentimes when a first agent 10 desires to operate on data at an address, a second agent 30 may have cached a copy of the data that is more current than the copy resident in an external cache. The first agent 10 should read the data from the second agent 10 rather than from the external cache 40. Without a means to coordinate among agents, an agent 10 may perform a data operation on stale data.

In a snoop phase, the agents coordinate to maintain cache coherency. In the snoop phase, each of the other agents 20–40 reports whether it possesses a copy of the data or whether it possesses a modified ("dirty") copy of the data at the requested address. In the Pentium Pro, an agent indicates that it possesses a copy of the data by asserting a HIT# pin in a snoop response. It indicates that it possesses a dirty copy of the requested data by asserting a HITM# pin. If dirty data exists, it is more current than the copy in memory. Thus, dirty data will be read by an agent 10 from the agent 20 possessing the dirty copy. Non-dirty data is read by an agent 10 from memory. Only an agent that possesses a copy of data at the requested address drives a snoop response; if an agent does not possess such a copy, it generates no response.

A snoop response is expected from all agents 10–40 within a predetermined period of time. Occasionally, an agent 30 cannot respond to another agent's request before the period closes. When this occurs, the agent 30 may generate a "snoop stall response" that indicates that the requesting agent 10 must wait beyond the period for snoop results. In the Pentium Pro processor, the snoop stall signal occurs when an agent 30 toggles outputs HIT# and HITM# from high to low in unison.

FIG. 2 illustrates components of a bus sequencing unit ("BSU") 100 and a core 200 within a processor 10 as are known in the art. The BSU 100 manages transaction requests generated within the processor 10 and interfaces the processor 10 to the external bus 50. The core 200 executes micro operations ("UOPs"), such as the processing operations that are required to execute software programs.

The BSU 100 is populated by a bus sequencing queue 140 ("BSQ"), an external bus controller 150 ("EBC"), a read line buffer 160 and a snoop queue 170. The BSQ 140 processes requests generated within the processor 10 that must be referred to the external bus 50 for completion. The EBC 150 drives the bus to implement requests. It also monitors transactions initiated by other agents on the external bus 50. The snoop queue 170 monitors snoop requests made on the external bus 50, polls various components within processor 10 regarding the snoop request and generates snoop results therefrom. The snoop results indicate whether the responding agent possesses non-dirty data, dirty data or is snoop stalling. Responsive to the snoop results, the EBC 150 asserts the result or the external bus.

As noted, the BSQ 140, monitors requests generated from within the processor 10 to be referred to the external bus 50 for execution. An example of one such request is a read of data from external memory to the core 200. "Data" may represent either an instruction to be executed by the core or variable data representing data input to such an instruction. The BSQ 140 passes the request to the EBC 150 to begin a transaction on the external bus 50. The BSQ 140 includes a buffer memory 142 that stores the requests tracked by the BSQ 140. The number of registers 142*a–h* in memory 142 determines how many transactions the BSQ 140 may track simultaneously.

The EBC 150 tracks activity on the external bus 50. It includes a pin controller 152 that may drive data on the external bus 50. It includes an in-order queue 154 that stores data that is asserted on the bus at certain events. For example, snoop results to be asserted on the bus during a snoop phase may be stored in the in-order queue 154. The EBC 150 interfaces with the snoop queue 170 and BSQ 140 to accumulate data to be asserted on the external bus 50.

During the data phase of a transaction, data is read from the external bus 50 into the read line buffer 160. The read line buffer 160 is an intermediate storage buffer, having a memory 162 populated by its own number of registers 162*a–h*. The read line buffer 160 provides for storage of data read from the external bus 50. The read line buffer 160 stores the data only temporarily; it is routed to another destination such as a cache 180 in the BSU 100, a data cache 210 in the core or an instruction cache 220 in the core. Data read into a read line buffer storage entry 162*a* is cleared when its destination becomes available.

There is a one-to-one correspondence between read line buffer entries 162*a–h* and BSQ buffer entries 140*a–h*. Thus, data from a request buffered in BSQ entry 142*a* will be read into buffer entry 162*a*. For each request buffered in BSQ buffer 142, data associated with the request is buffered in the buffer memory 162 in the read line buffer 162.

The one to one correspondence between the depth of the BSQ buffer 142 and the read line buffer 160 is inefficient.

Read line buffer utilization is very low. The read line buffer 160 operates at a data rate associated with the BSU 100 and the core 200 which is much higher than a data rate of the external bus 50. Thus, data is likely to be read out of the read line buffer 160 faster than the bus 50 can provide data to it. The one to one correspondence of BSQ buffer entries to the read line buffer entries is unnecessary. Also, the read line buffer storage entries 162_a–h_ consume a significant amount of area when the processor is fabricated as an integrated circuit.

It is desired to increase the depth of buffers in the BSQ 140. In the future, latency between the request phase and the data phase of transactions on the external bus 50 is expected to increase. External buses 50 will become more pipelined. Consequently, a greater number of transactions will progress on the external bus 50 at once. Accordingly, greater depth of BSQ buffers 142 will be necessary to track these transactions. However, because it requires a corresponding increase in the depth of the read line buffer 162, increasing the depth of such buffers 142 incurs substantial area costs. Also, it would further decrease the already low utilization of the read line buffer 160. Accordingly, there is a need in the art for a processor architecture that severs the relationship between the read line buffer depth and the BSQ buffer depth.

SUMMARY OF THE INVENTION

Embodiments of the present invention control a read transaction for a processor. A request is generated on an external bus for data to be read to the processor. The requested data is read from the external bus to an intermediate memory in the processor and, thereafter, read from the intermediate memory to a destination. When the intermediate memory is full, the read of data from the external bus is stalled until the intermediate memory is no longer full.

DETAILED DESCRIPTION

Figure 1:
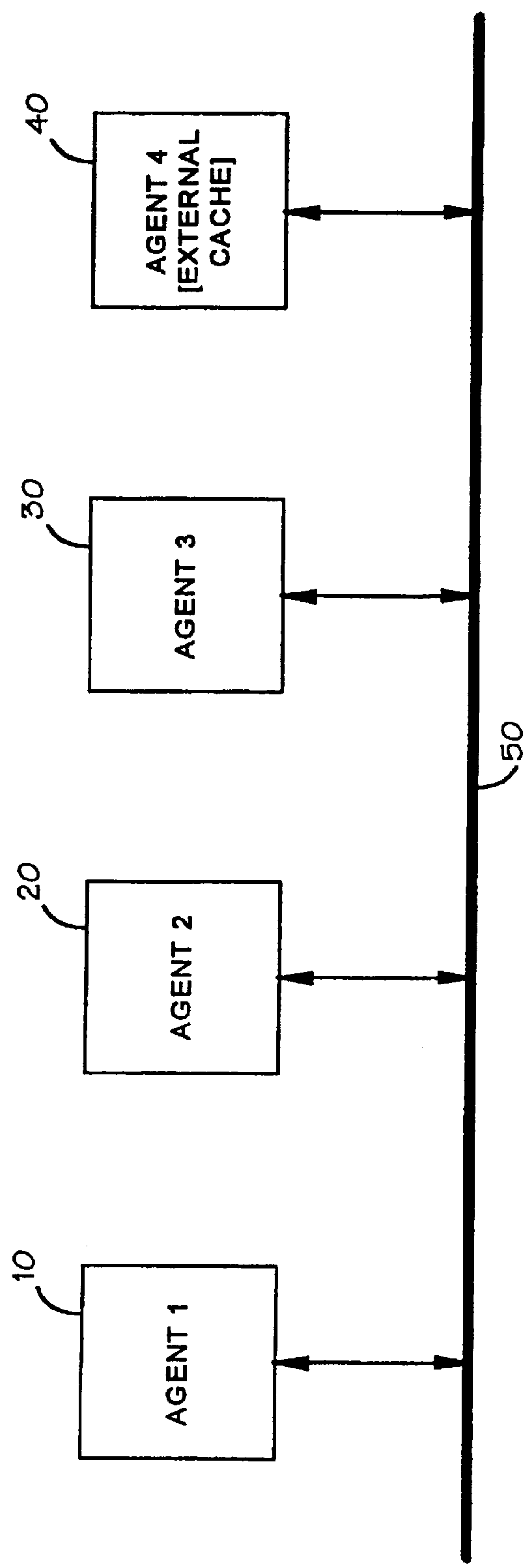
FIG. 1 is a block diagram of a system finding application with the present invention.
Figure 3:
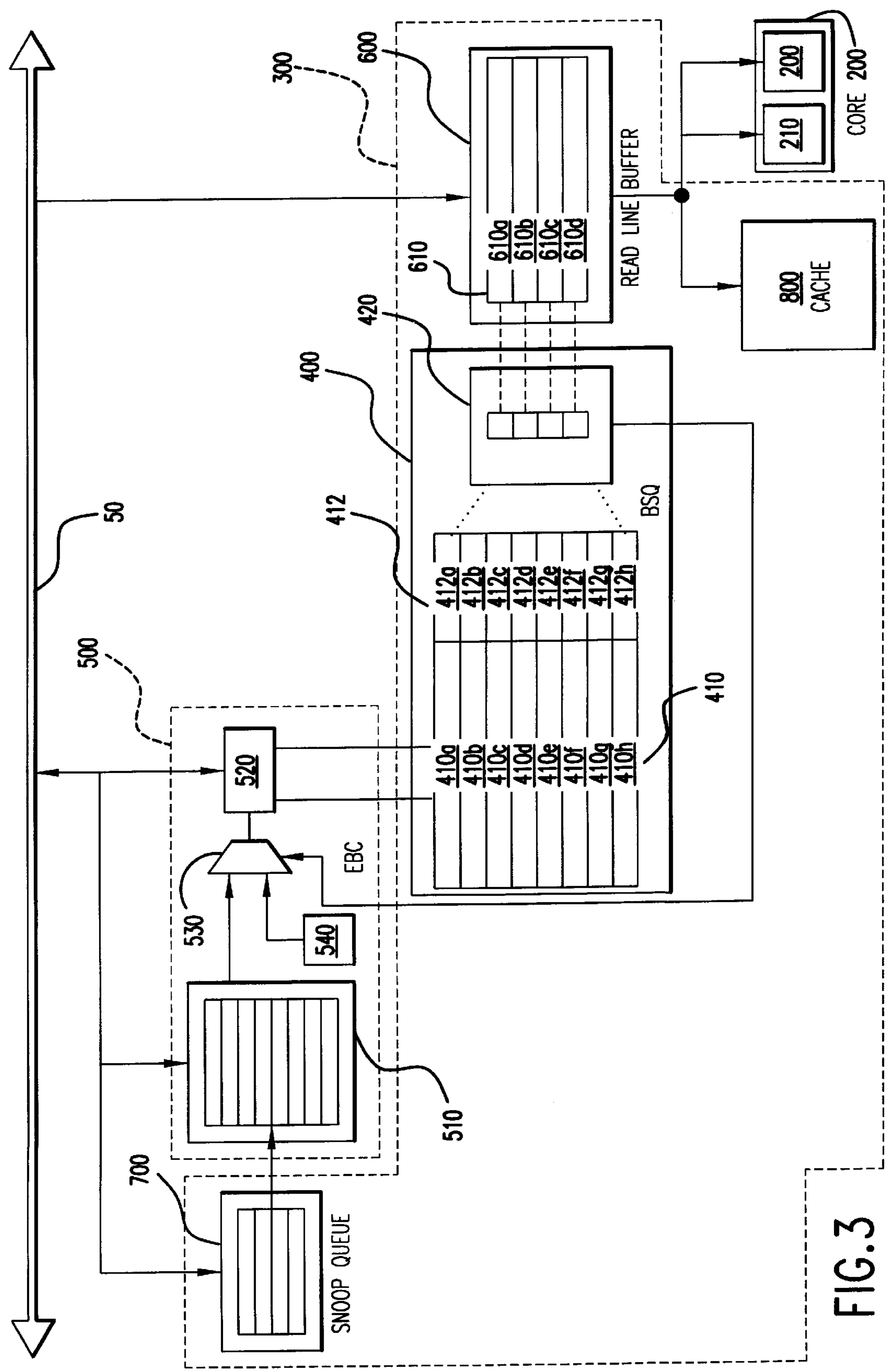
FIG. 3 is a block diagram of a bus sequencing unit and a processor core constructed in accordance with an embodiment of the present invention.

Turning to FIG. 3, there is shown a bus sequencing unit 300 ("BSU") constructed in accordance with an embodiment of the present invention. The BSU 300 is populated by a bus sequencing queue 400 ("BSQ"), a read line buffer 600, a snoop queue 700 and a cache 800. An external bus controller 500 ("EBC") exchanges data between the external bus 50 and the BSU 300. The BSU 300 exchanges data with the processor core 200. A BSU 300 typically is provided for each processor 10 of FIG. 1.

The BSU 300 retains the high level functionality of conventional BSUs. The BSQ 400 administers transactions to be performed on the external bus 50 on behalf of the processor 10 to which the BSU 300 belongs. The EBC 500 administers all transactions performed on the external bus 50, both those initiated by the processor 10 as well as the other agents on the external bus 50. The snoop queue 700 answers snoop requests initiated on the external bus 50 by polling various components within the processor 10 and generating snoop results. The read line buffer 600 stores data received from the external bus 50 and destined for a unified cache 800, a core data cache 210 or a core instruction cache 220.

The BSU 300 improves over conventional BSUs because it severs the one-to-one correspondence between buffer entries in the BSQ 400 and those of the read line buffer 600. Both the BSQ 400 and the read line buffer possess buffer memories, 410 and 610 respectively. However, the buffer memory 610 of the read line buffer possesses many fewer entries 610_a–d_ than that of the BSQ buffer memory 410. In fact, depending upon the relative speeds of the external bus 50 and the internal processes of the processor 10, the read line buffer 600 may possess as few as one buffer entry 610_a_. Typically, however, at least two entries are provided to guard against busy destination events (described below).

Figure 2:
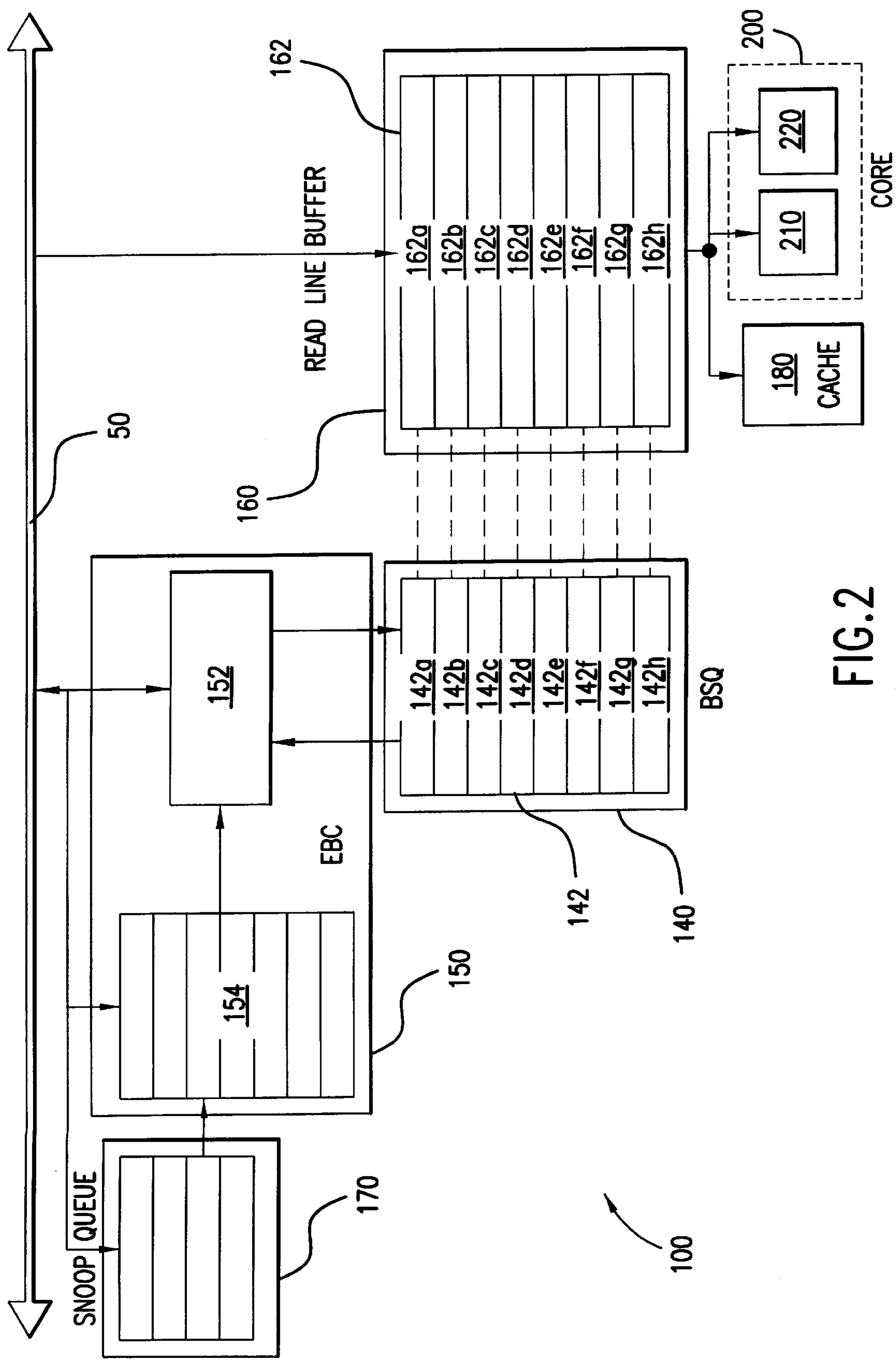
FIG. 2 is a block diagram of a bus sequencing unit as is known for a processor.

The BSQ buffer memory 410 is populated by a plurality of buffer entries 410_a–h_ and also by identifier registers 412_a–h_. One identifier register 412_a_ is provided for each buffer entry 410_a_. The buffer entries 410_a–h_ buffer requests received and processed by the BSQ 400. In this sense, they finction similarly to the buffer entries 142_a–h_ of known BSQs (FIG. 2). For a request buffered in a buffer entry 410_a,_ the associated identifier register 412_a_ identifies a read line buffer entry 610 that is designated as a destination for data to be received in accordance with that request.

The BSQ 400 also includes a manager 420. The manager 420 identifies which read line buffer entries 610_a–d_ are busy at any given time. A read line buffer entry is "busy" when it holds data that has not yet been read to its destination. Thus, by polling the manager 420, the BSQ 400 avoids busy read line buffer entries 610_a–d_ when designating a destination for a request newly received. Typically, the manager 420 provides marking bits, one associated with each buffer entry 610_a–d_ to mark the entries as busy or not busy. The manager 420 also generates a buffer full signal on line 422 when every buffer entry 610_a–d_ in the read line buffer 600 is busy.

The EBC 500 includes an in-order queue 510 as is known in the art. The in-order queue 510 monitors the transactions on pipelined bus and the stage that each transaction is in. The in-order queue 510 receives snoop results from the snoop queue 700 and, where appropriate, outputs the snoop results.

The EBC 500 also includes a snoop stall switch 530 that receives the snoop results output from the in-order queue 510. It also receives, as a second input, a snoop stall signal generated by a snoop stall signal generator 540. Switch 530 selects among the inputs in response to the buffer full signal generated by the manager 420. An output of the switch is input to the snoop pin controller 520. The snoop pin controller 520 drives the snoop lines on the external bus 50.

Figure 4:
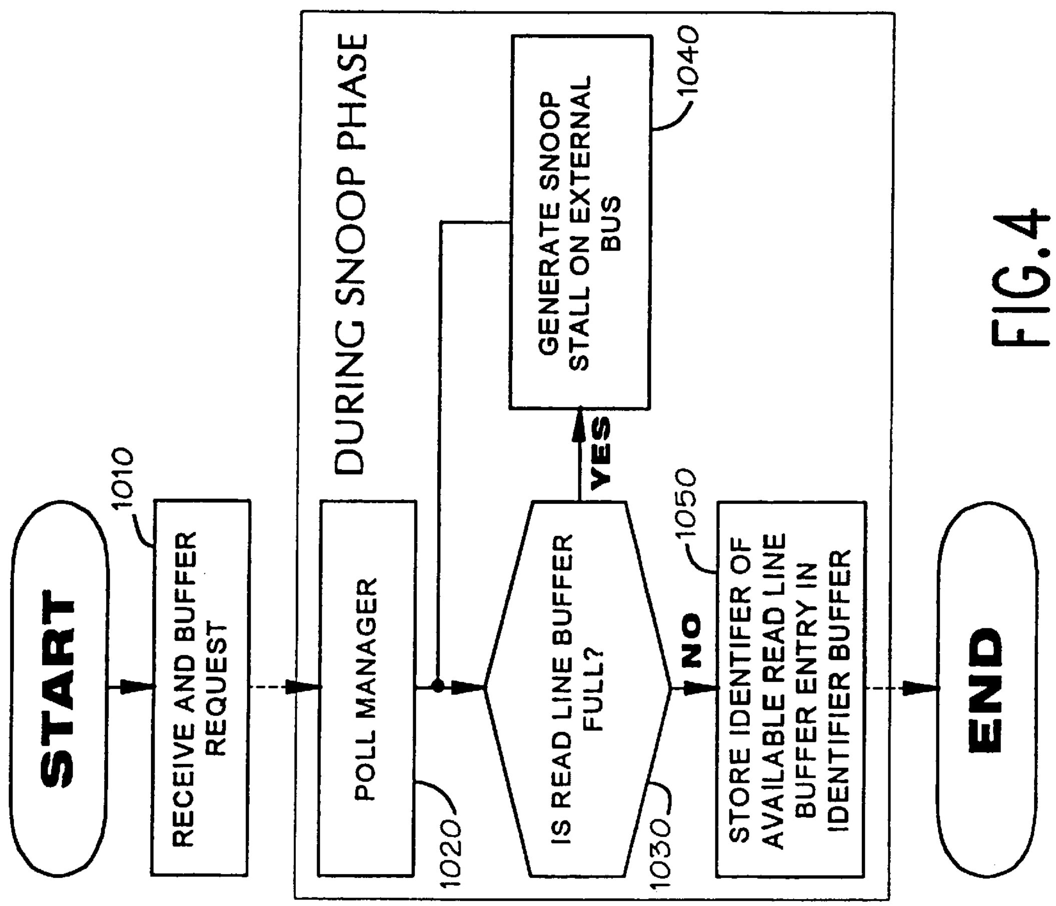
FIG. 4 is a flow diagram illustrating a method of operation of the bus sequencing unit in accordance with an embodiment of the present invention.

In an embodiment of the present invention, the BSU 300 may operate in accordance with the method of FIG. 4. There, the BSU 300 receives and buffers requests as is known in the art (Step 1010). As is typical, the request is buffered in the buffer memory 410. The BSQ 400 and EBC 500 coordinate to execute a bus transaction and fulfill the request. Eventually, the transaction will advance to the snoop phase of the transaction. If the request requires a read of data from the external bus 50, the BSU 300 polls the manager 420 to determine the status of the read line buffer 600 (Step 1020). If the read line buffer 600 is full (Step 1030), the BSU 300 requests the EBC 500 to generate a snoop stall signal (Step 1040) and waits until an entry in the read line buffer 600 becomes available. If the read line buffer 600 is not full, the BSU assigns an entry in the read line buffer 600 as a destination for the data to be read from the external bus 50 and stores an identifier of the assigned entry in the identifier buffer 412 (Step 1050). From step 1050, the BSU 300 completes the bus transaction according to known procedures.

The snoop stall signal generated at step 1040 causes the BSU 300 to stall its the transaction from progressing further. As is known, during the snoop phase, the bus owner receives snoop results to determine where to read the data. Snoop results are detected by the BSQ 400 from the pin controller 520. By generating the snoop stall signal on the external bus 50, the BSU 300 stalls its own transaction until data drains from the read line buffer 600 and buffer entries therein become available. However, the BSU 300 is free to process other requests on the pipelined bus and to issue new requests as necessary.

As a practical matter, at least one entry in the buffer memory 610 should be available almost always. The higher internal operating speed of the processor 10 should cause data to be drained from the read line buffer 600 at a faster rate than the external bus 50 can supply data to it. Thus, the BSU 300 is expected to snoop stall its own transaction only in the most unlikely of circumstances.

Although unlikely, it is possible that system contentions will cause the read line buffer 600 to be busy. While a bus transaction is being completed, the core 200 causes other data transfers to be made internally. For example, data can be read from the unified cache 800 to the core data cash 210. The data transfer causes both the unified cache 800 and the core data cache 210 to be busy momentarily. When a destination is busy, data intended for that destination may not be read out of the read line buffer 600. A high occurrence of internal data transfers can cause the read line buffer 600 fill entirely with data. In this event, data could not be read from the external bus 50 to the read line buffer 600 without overwriting data in the buffer memory 610 to become lost.

The BSU 300 of the present invention provides general advantages over BSUs of the prior art. They include:

A smaller, more efficient read line buffer 600 with higher utilization than in read line buffers of the prior art.

A control system that does not hang when the read line buffer 600 is full. Even when the read line buffer 600 is full, the BSU 300 begins the next bus transaction. The BSU 300 can snoop stall itself if the read line buffer 600 remains full even up to the snoop phase of the transaction that will cause new data to be read to the read line buffer 600.

When the BSU 300 snoop stalls its own transaction, most other transactions on the pipelined external bus 50 are unaffected. Consider an example where three transactions progress on the external bus at one time: A first transaction is past the snoop phase, a second transaction is snoop stalled at the snoop phase as described above and a third transaction is in some phase before the snoop phase (i.e. it is in one of the arbitration, request, or error phases). Although the second transaction is snoop stalled, it has no effect on the first transaction. The first transaction may progress normally. The third transaction also progresses normally until it reaches the snoop phase. If the second transaction is snoop stalled long enough for the third transaction to reach the snoop phase, the third transaction also would be stalled until the second transaction completes the snoop phase. However, oftentimes, the second transaction snoop stalls only briefly, and resumes progress before the stall has an effect on subsequent transactions. If the snoop stall of the second transaction discontinues and the second transaction exits the snoop phase by the time the third transaction reaches the snoop phase, the snoop stall of the second transaction has no effect on the third transaction. Again, because the read line buffer should drain much faster than the external bus can supply data to it, snoop stalling of one transaction should impeded another transaction in rare circumstances only.

Several embodiments of the present invention have been discussed above. It will be appreciated that modifications and variations of the present invention are covered by the above teachings and within the purview of the appended claims without departing from the spirit and intended scope of the invention.

We claim:

1. A method of controlling a read transaction for a processor, comprising:

generating a request on an external bus for data to be read to the processor, reading the requested data from the external bus to an intermediate memory in the processor, reading the requested data from the intermediate memory to a destination, when the intermediate memory is full, generating a stalling signal on the external bus until the intermediate memory is no longer full.

2. The method of claim 1, wherein the stalling signal is generated during a phase of the read transaction in which cache coherency checks are performed.

3. The method of claim 1, wherein the second generating step does not stall any other transactions present on the pipelined bus.

4. The method of claim 1, wherein the second generating step occurs during a phase of the read transaction in which cache coherency checks are performed.

5. A bus sequencing unit for a processor, comprising a bus sequencing queue having a queue memory with a plurality of entries, an external bus controller, coupled to the bus sequencing queue and to an external bus, a read line buffer coupled to the external bus and having a buffer memory with a plurality of entries, the number of read line buffer entries being less than the number of queue memory entries, an identifier memory providing a plurality of entries, one associated with each entry of the queue memory, wherein requests to be executed on the external bus are stored in the queue memory and an identification of a read line buffer entry associated with the request is stored an associated entry in the identifier memory.

6. The bus sequencing unit of claim 5, further comprising a manager in communication with the read line buffer and generating an output signal when the read line buffer is full, the output signal being input to the external bus controller and causing the external bus controller to generate a stall signal on the external bus.

7. The bus sequencing unit of claim 6, the external bus further comprising:

a pin controller that drives the external bus, a signal generator generating a stall signal, and a selection switch controlled by the output signal, the switch receiving an output of the signal generator as an input and having an output coupled to the pin controller.

8. A method of processing bus transactions generated by a processor, comprising:

receiving a request for a bus transaction, queuing the request in a memory, issuing the request on an external bus, pursuant to the request, reading the data into the processor, before data to be read to the processor is present on the external bus, determining whether the processor may receive the data, when the processor cannot receive the data, generating a stalling signal on the external bus until the processor may receive the data.

9. The method of claim 8, further comprising:

when the processor can receive the data, reading the data into an intermediate memory, and reading the data from the intermediate memory to a destination.

10. The method of claim 8, further comprising:

when the processor can receive the data, identifying an entry in an intermediate memory in which the data should be read, and storing an identifier of the entry in association with queued transaction in the memory.

11. The method of claim 8, wherein the external bus is a pipelined bus and the stall signal stalls only the transaction to which the data relates.

12. A method of controlling a read transaction for a processor, comprising:

posting a request on an external bus for data to be read to the processor;

when an intermediate memory is full and prior to a time that data is to be read to the processor pursuant to the request, generating a stall signal on an external bus until the intermediate memory is no longer full; and thereafter:

reading the requested data from the external bus to the intermediate memory in the processor, and reading the requested data from the intermediate memory to a destination.

* * * * *